(12) United States Patent
Lord et al.

(10) Patent No.: US 10,563,585 B2
(45) Date of Patent: Feb. 18, 2020

(54) HEAT EXCHANGER FOR GAS TURBINE ENGINE

(71) Applicant: UNITED TECHNOLOGIES CORPORATION, Farmington, CT (US)

(72) Inventors: Wesley K. Lord, South Glastonbury, CT (US); Nathan Snape, Tolland, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 706 days.

(21) Appl. No.: 15/058,229

(22) Filed: Mar. 2, 2016

(65) Prior Publication Data
US 2017/0254268 A1 Sep. 7, 2017

(51) Int. Cl.
*F02C 7/18* (2006.01)
*F02C 6/08* (2006.01)
*F02K 3/115* (2006.01)

(52) U.S. Cl.
CPC .............. *F02C 7/185* (2013.01); *F02C 6/08* (2013.01); *F02K 3/115* (2013.01)

(58) Field of Classification Search
CPC ............ B64D 13/08; B64D 2013/0614; F05D 2260/213; F02C 7/141
See application file for complete search history.

(56) References Cited

U.S. PATENT DOCUMENTS

| | | | | |
|---|---|---|---|---|
| 4,791,782 A | * | 12/1988 | Seed | F01P 7/02 137/601.17 |
| 5,133,194 A | | 7/1992 | Army, Jr. et al. | |
| 5,269,135 A | * | 12/1993 | Vermejan | F02C 7/04 60/226.1 |
| 7,607,308 B2 | * | 10/2009 | Kraft | F02C 6/08 60/226.1 |
| 7,808,135 B2 | | 10/2010 | Salamah et al. | |
| 7,861,513 B2 | * | 1/2011 | Stretton | B64C 7/02 60/226.1 |
| 8,157,503 B2 | | 4/2012 | Junod | |
| 8,397,487 B2 | | 3/2013 | Sennoun et al. | |
| 8,826,641 B2 | | 9/2014 | Suciu et al. | |
| 8,833,053 B2 | | 9/2014 | Chir et al. | |
| 8,904,753 B2 | | 12/2014 | Murphy | |
| 8,978,351 B2 | | 3/2015 | Suciu et al. | |
| 9,038,397 B2 | | 5/2015 | Papa et al. | |
| 9,080,511 B2 | | 7/2015 | Suciu et al. | |
| 9,200,569 B2 | | 12/2015 | Suciu et al. | |

(Continued)

OTHER PUBLICATIONS

European Search Report for European Application No. 17158524.3 dated Jun. 27, 2017.

*Primary Examiner* — Gerald L Sung
*Assistant Examiner* — Rene D Ford
(74) *Attorney, Agent, or Firm* — Carlson, Gaskey & Olds, P.C.

(57) ABSTRACT

A gas turbine engine component includes a heat exchange structure having an upstream end and a downstream end. A diffusing duct is associated with the upstream end. A throttle member controls air flow through the heat exchange structure, wherein the throttle member: (a) has a non-circular cross section; and (b) is mounted to the downstream end of the heat exchange structure or is mounted between the upstream end and the diffusing duct.

27 Claims, 7 Drawing Sheets

(56) References Cited

U.S. PATENT DOCUMENTS

| | | |
|---|---|---|
| 9,222,411 B2 | 12/2015 | Sennoun |
| 2007/0245738 A1* | 10/2007 | Stretton .................. F02C 7/141 60/728 |
| 2007/0245739 A1* | 10/2007 | Stretton ................ F01D 17/105 60/728 |
| 2012/0111011 A1* | 5/2012 | Pike .......................... F02C 7/04 60/722 |
| 2013/0319002 A1 | 12/2013 | Sidelkovsky |
| 2015/0247462 A1 | 9/2015 | Suciu |
| 2015/0308339 A1 | 10/2015 | Forciier |
| 2016/0312702 A1 | 10/2016 | Thomas |
| 2017/0002747 A1 | 1/2017 | Fert et al. |

* cited by examiner

HEAT EXCHANGER FOR GAS TURBINE ENGINE

BACKGROUND OF THE INVENTION

Gas turbine engines include various thermal management systems that include heat exchangers and other associated flow control components that exchange heat generated by the gas turbine engine with bypass airflow. The gas turbine architecture for each different type of engine determines where heat exchangers are located. In certain locations, the heat exchangers may partially block or disrupt thrust airflow. Further, conventional heat exchangers have a tendency to take up a significant amount of packaging area due to long duct transitions between the various system components.

In certain applications, heat exchangers with large square or rectangular frontal areas are required to provide specified operational characteristics. These heat exchangers are used with flow control valves that are positioned upstream of the heat exchanger, and which control an amount of air that is introduced into the heat exchanger. These valves have a circular shape and operate within relatively small duct sections that have a round cross-section. The transitions between the round and rectangular sections are long and complex, making it difficult to effectively package the components, and can also result in flow distortion leading to reduced engine operating efficiencies.

SUMMARY OF THE INVENTION

In a featured embodiment, a gas turbine engine component includes a heat exchange structure having an upstream end and a downstream end. A diffusing duct is associated with the upstream end. A throttle member controls air flow through the heat exchange structure, wherein the throttle member: (a) has a non-circular cross section; and (b) is mounted to the downstream end of the heat exchange structure or is mounted between the upstream end and the diffusing duct.

In another embodiment according to the previous embodiment, the throttle member includes a frame defining a non-circular cross-sectional flow area and a moveable member mounted for movement relative to the frame, wherein the moveable member is moveable between a fully open position where a minimum amount of the non-circular cross-sectional flow area is blocked and a fully closed position where a maximum amount of the non-circular cross-sectional flow area is blocked.

In another embodiment according to any of the previous embodiments, the non-circular cross-sectional flow area comprises a polygonal cross-sectional flow area.

In another embodiment according to any of the previous embodiments, the moveable member comprises a plurality of horizontal or vertical louvers.

In another embodiment according to any of the previous embodiments, the moveable member comprises a pivoting or sliding vane or door.

In another embodiment according to any of the previous embodiments, the throttle member includes a frame that is mounted directly to the downstream end of the heat exchange structure.

In another embodiment according to any of the previous embodiments, the throttle member includes a frame that is mounted directly between the diffusing duct and the upstream end of the heat exchange structure.

In another embodiment according to any of the previous embodiments, the diffusing duct includes a duct portion that increases in cross-sectional flow area from an upstream duct end to a downstream duct end.

In another embodiment according to any of the previous embodiments, the diffusing duct comprises a first stage and a second stage downstream of the first stage, and wherein the first stage comprises an axial duct portion of generally constant cross-sectional flow area, and wherein the second stage comprises the duct portion that extends from the upstream duct end to the downstream duct end.

In another embodiment according to any of the previous embodiments, an actuator is configured to control the throttle member, and is located remotely from the heat exchange structure.

In another featured embodiment, a gas turbine engine component includes a heat exchange structure having an upstream end and a downstream end. A diffusing duct is associated with the upstream end. A throttle member includes a frame mounted directly to the downstream end of the heat exchange structure, the frame defining a non-circular cross-sectional flow area, and wherein the throttle member includes a moveable member mounted for movement relative to the frame, wherein the moveable member is moveable between a fully open position where a minimum amount of the non-circular cross-sectional flow area is blocked and a fully closed position where a maximum amount of the non-circular cross-sectional flow area is blocked. An actuator is configured to control movement of the moveable member between the fully open and fully closed positions.

In another embodiment according to the previous embodiment, the non-circular cross-sectional flow area comprises a rectangular or square cross-sectional flow area.

In another embodiment according to any of the previous embodiments, the moveable member comprises a plurality of pivoting louvers that are coupled to the actuator.

In another embodiment according to any of the previous embodiments, the frame includes a downstream frame end and an upstream frame end that is mounted directly to the downstream end of the heat exchange structure, and including an outlet duct that is mounted to the downstream frame end, the outlet duct providing an outlet into an engine bypass flow path.

In another embodiment according to any of the previous embodiments, the actuator controls a pivot angle of the plurality of pivoting louvers such that the louvers vector flow exiting the outlet to be aligned with bypass flow during predetermined operating conditions.

In another embodiment according to any of the previous embodiments, the diffusing duct comprises a first diffusing stage providing an axial duct portion of a generally constant first cross-sectional flow area and a second diffusing stage downstream of the first diffusing stage, and wherein the second diffusing stage comprises an increasing duct portion having an upstream duct end having the first cross-sectional flow area and a downstream duct end having a second cross-sectional flow area that is greater than the first cross-sectional flow area.

In another embodiment according to any of the previous embodiments, a flexible bellows is mounted to an upstream duct end of the diffusing duct.

In another featured embodiment, a gas turbine engine includes an outer nacelle surrounding a fan that rotates about an engine axis, the outer nacelle having an upstream nacelle end and a downstream nacelle end. A core nacelle is positioned radially inward of the outer nacelle and surrounding a core engine that includes at least one spool that rotates about the engine axis and interconnects the fan with a compressor section and a turbine section, and wherein a bypass flow path is defined between the outer nacelle and the core nacelle. An upper bifurcation structure is configured to extend between the outer nacelle and the core nacelle. A heat exchanger is at least partially incorporated into the upper bifurcation structure, wherein the heat exchanger comprises a pre-cooler having an upstream end and a downstream end, a diffusing duct associated with the upstream end, and a throttle member mounted to the downstream end of the pre-cooler or mounted between the upstream end of the pre-cooler and the diffusing duct, and wherein the throttle member comprises a frame defining a non-circular cross-sectional flow area and a moveable member mounted for movement relative to the frame to throttle flow.

In another embodiment according to any of the previous embodiments, the frame is mounted directly to the downstream end of the pre-cooler, and wherein the moveable member comprises a plurality of pivoting vanes or louvers that are moveable between a fully open position where a minimum amount of the non-circular cross-sectional flow area is blocked and a fully closed position where a maximum amount of the non-circular cross-sectional flow area is blocked.

In another embodiment according to any of the previous embodiments, an actuator is coupled to the moveable member to control movement of the moveable member between open and closed positions, and wherein the actuator is located remotely from the heat exchanger.

The foregoing features and elements may be combined in any combination without exclusivity, unless expressly indicated otherwise.

These and other features may be best understood from the following drawings and specification.

DETAILED DESCRIPTION

Figure 1:
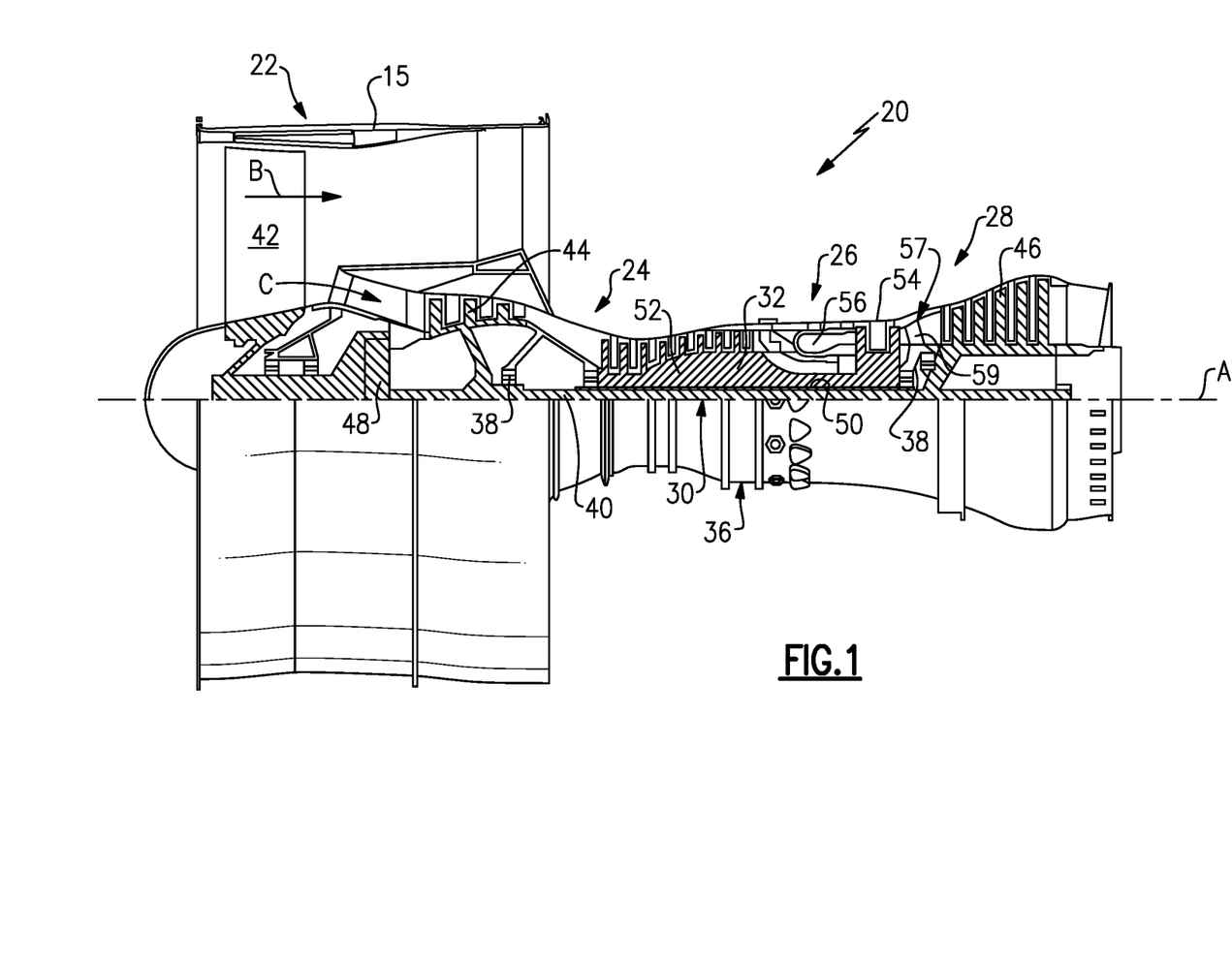
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
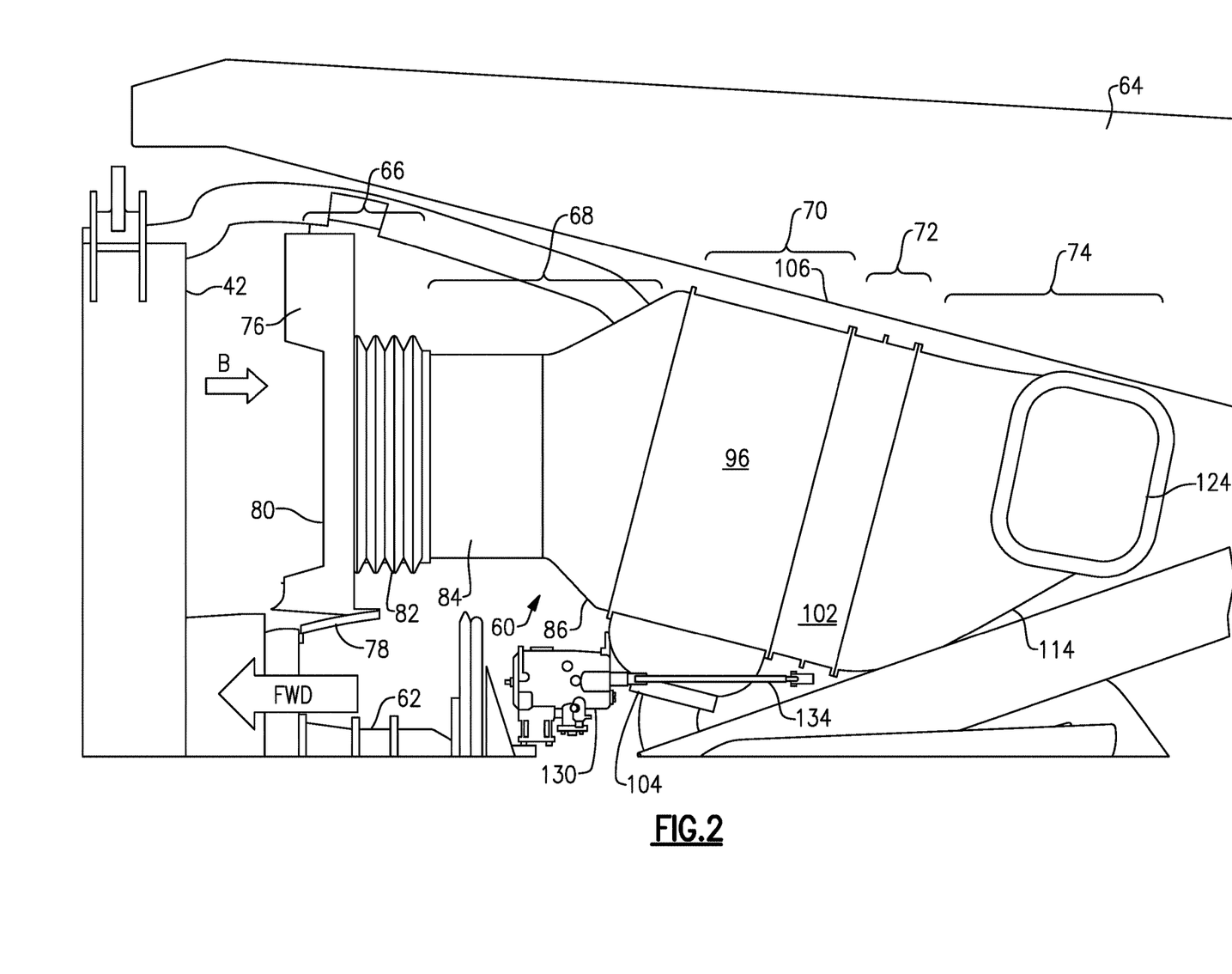
FIG. 2 is a side view of an example of a heat exchanger system incorporating the subject invention.
Figure 3:
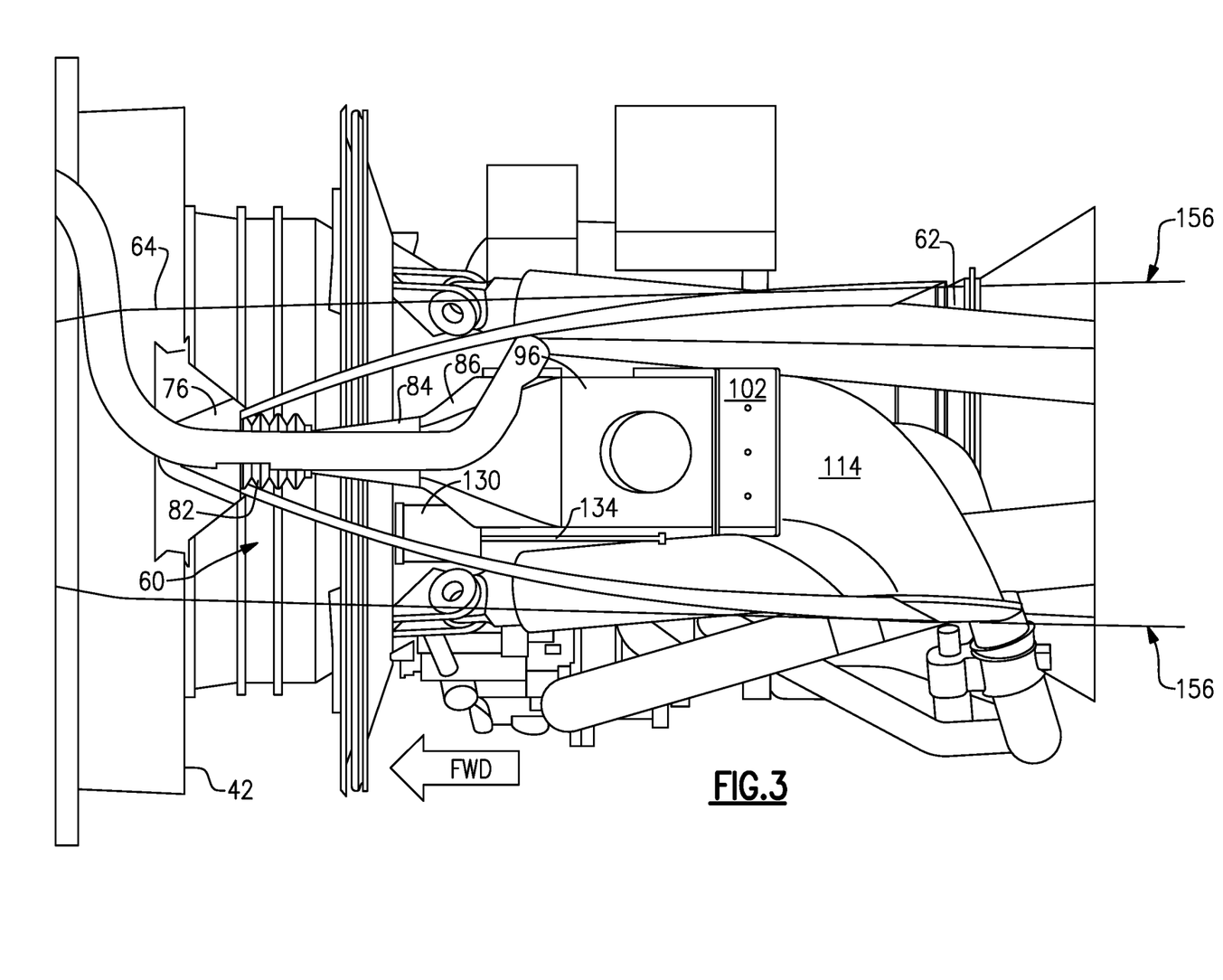
FIG. 3 is a top view, as seen through a pylon floor, of the system shown in FIG. 2.
Figures 4A, 4B:
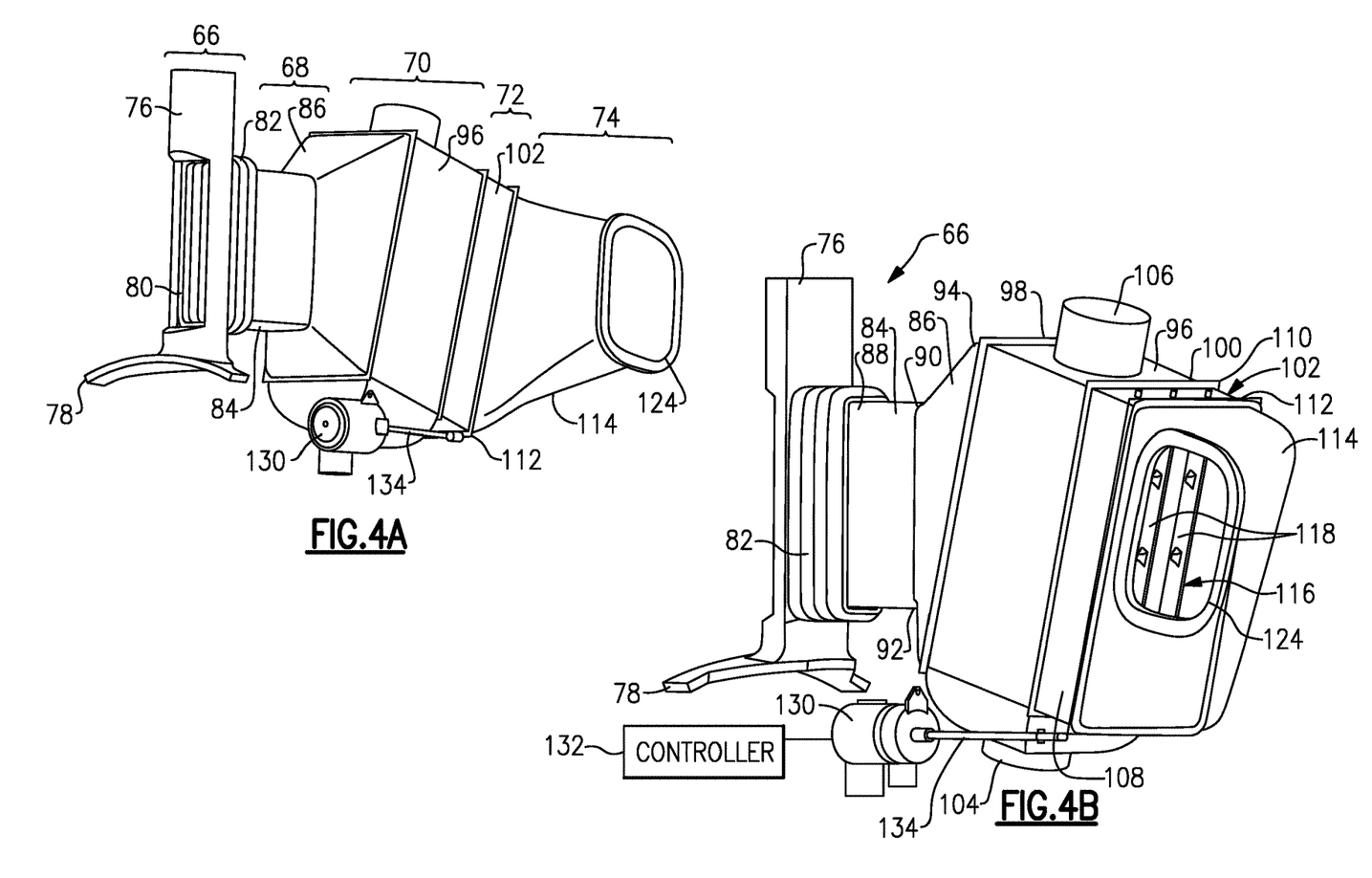
FIG. 4A is an isometric view of the heat exchanger system shown in FIG. 2 from an inlet end.
FIG. 4B is an isometric view of the heat exchanger system shown in FIG. 2 from an outlet end.
Figure 5:
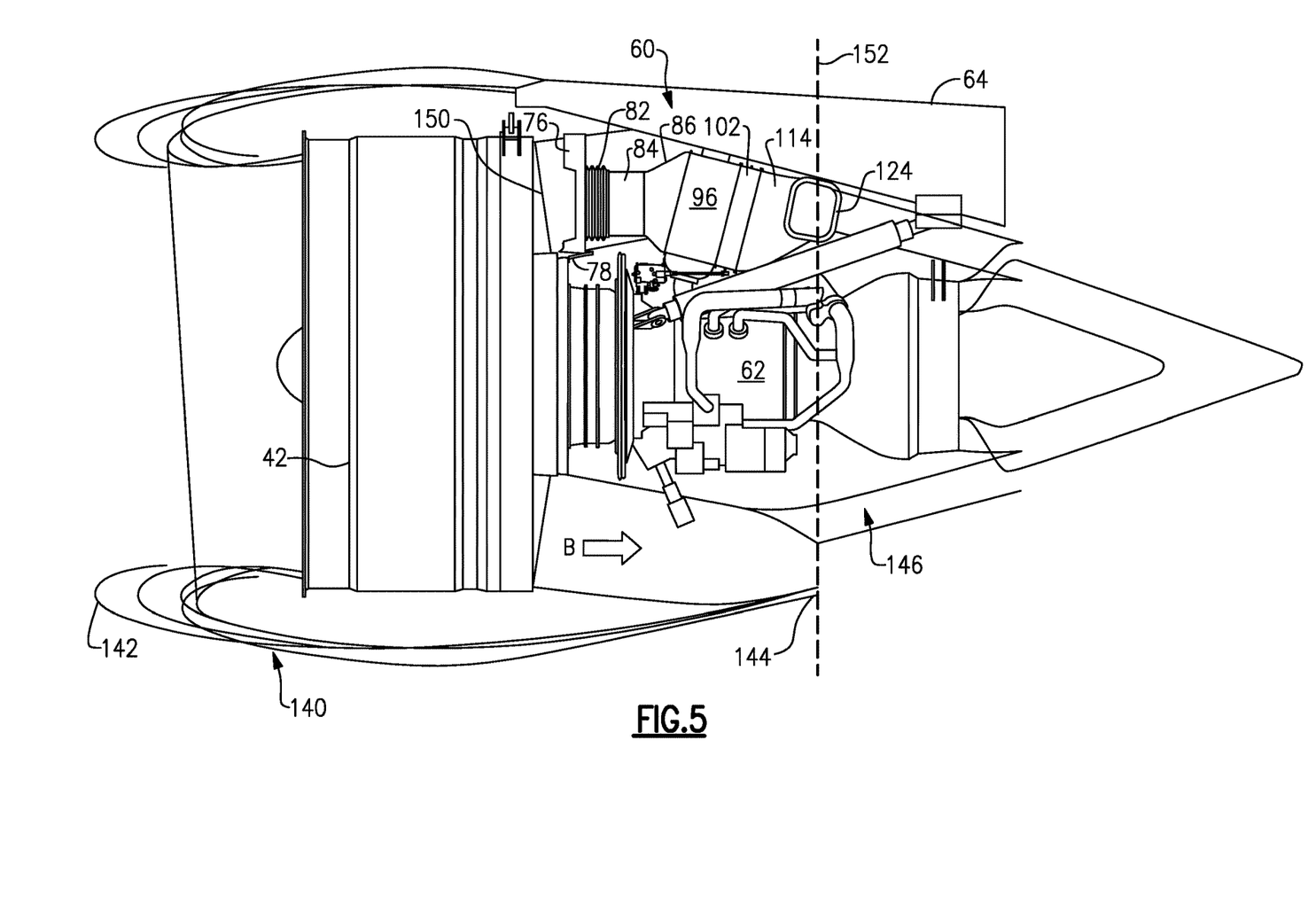
FIG. 5 is a side view of the heat exchanger system shown in FIG. 2 in a gas turbine engine, and which shows nacelle lines for the fan and core engine.

FIGS. 2-3 and 5 show a cooling or heat exchange system 60 that is positioned downstream of the fan 42 between a core engine 62 and a pylon structure 64. The heat exchange system 60 includes an inlet section 66, a diffusing section 68, a heat exchange or pre-cooler section 70, a throttle section 72, and an outlet section 74. In the example shown in FIGS. 2-5, the heat exchange system 60 uses bypass flow B to cool high temperature engine air to be used within an aircraft cabin; however, the subject invention of the heat exchange system can also be used in other systems that use air as a cooling medium.

As best shown in FIGS. 2 and 4A-4B, the inlet section 66 includes a bracket 76 that is mounted to a static structure 78 and which includes an inlet opening 80. A bellows 82 has an upstream end attached to the bracket 76 and a downstream end connected to the diffusing section 68. The bellows 82 accounts for any misalignment between engine and nacelle structures.

The diffusing section 68 includes a first stage diffuser 84 and a second stage diffuser 86 downstream of the first stage diffuser 84. The first stage diffuser 84 comprises an axial duct portion having an inlet end 88 mounted directly to the bellows 82 and an outlet end 90 mounted directly to the second stage diffuser 86. The axial duct portion has a generally constant cross-sectional area from the inlet end 88 to the outlet end 90. In one example, the cross-sectional area comprises a polygonal cross-sectional shape such as square or rectangular, for example. The first stage diffuser 84 is configured to slow down the air flow without losing pressure and thus serves as a pre-diffuser.

The second stage diffuser 86 has an upstream end 92 directly attached to the first stage diffuser 84 and a downstream end 94 mounted directly to the heat exchanger or pre-cooler 96 in the heat exchange section 70. The second stage diffuser 86 comprises an increasing duct portion that has generally the same cross-sectional area as the first stage diffuser 84 at the upstream end 92, and which increases in cross-sectional area at the downstream end 94. In the example shown, the cross-sectional area comprises a polygonal cross-sectional shape and continuously increases in size extending in a direction from the upstream end to the downstream end. The increased cross-sectional area further slows the air prior to entering the pre-cooler 96.

The pre-cooler 96 comprises a non-circular, polygonal shaped structure that has an upstream end 98 directly connected to the second stage diffuser 86 and a downstream end 100 directly connected to a throttle member 102 of the throttle section 72. The pre-cooler 96 comprises a square or rectangular shaped body that comprises a plate and/fin configuration that operates to exchange heat as known. Heated air enters through an inlet 104, is subsequently cooled by bypass air flow B, and exits through an outlet 106 that communicates with the aircraft cabin.

The throttle member 102 serves as a valve structure that regulates or throttles a desired amount of bypass air through the pre-cooler 96. The throttle member 102 comprises a frame 108 that has a polygonal shape, i.e. non-circular shape, which matches the shape of the pre-cooler 96. In the example shown, the frame 108 has a rectangular shape that defines a rectangular cross-sectional flow path. The frame 108 has an upstream end 110 that is mounted directly to the pre-cooler 96 and a downstream end 112 that is mounted directly to an outlet duct 114 of the outlet section 74. A moveable member 116 is mounted for movement relative to the frame 108 and is moveable between a fully open position where a minimum amount of the non-circular cross-sectional flow area is blocked and a fully closed position where a maximum amount of the non-circular cross-sectional flow area is blocked.

Figures 6A, 6B:
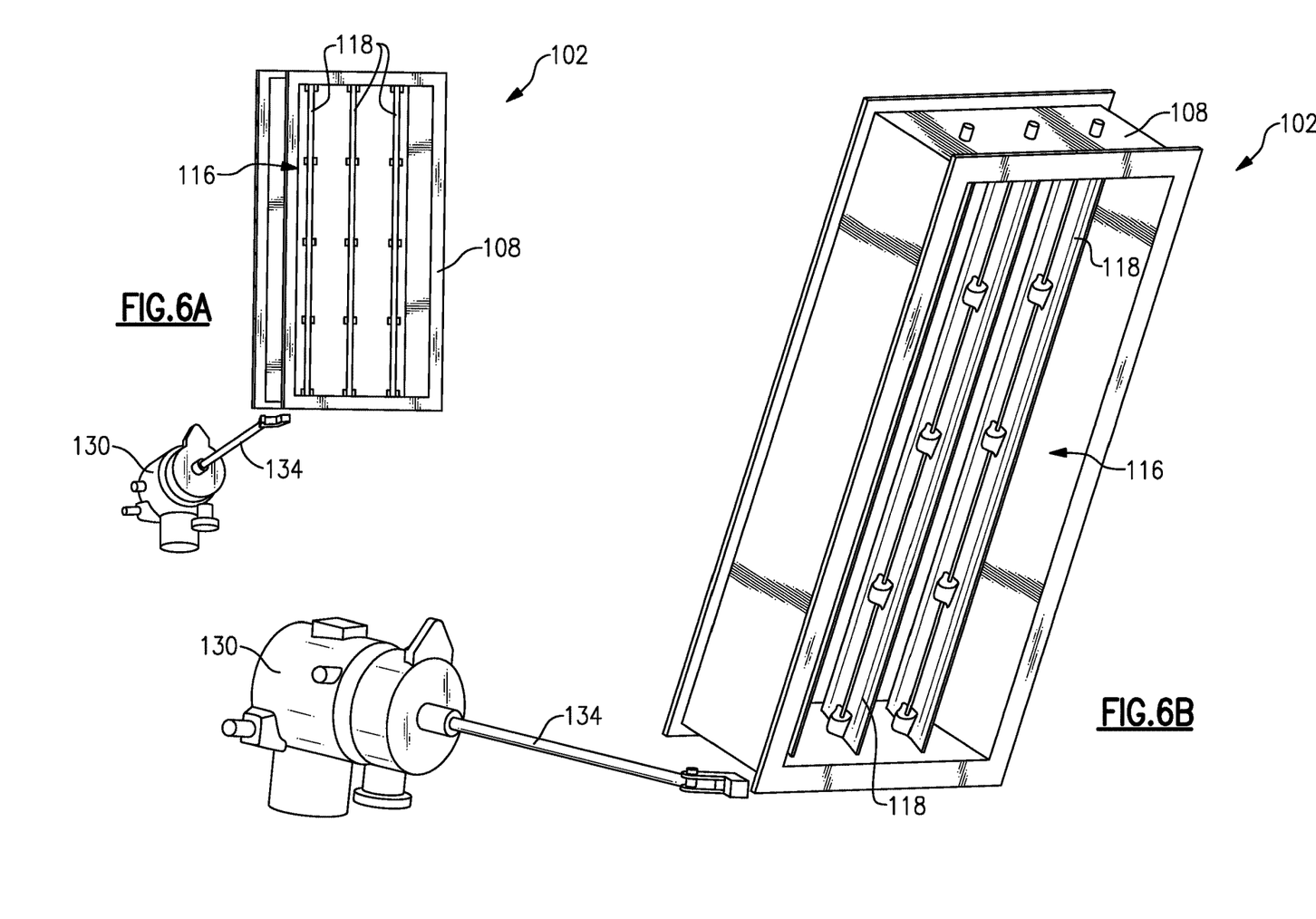
FIG. 6 is a schematic view of one example of a throttle member as used in the heat exchanger system shown in FIG. 2.
Figure 7:
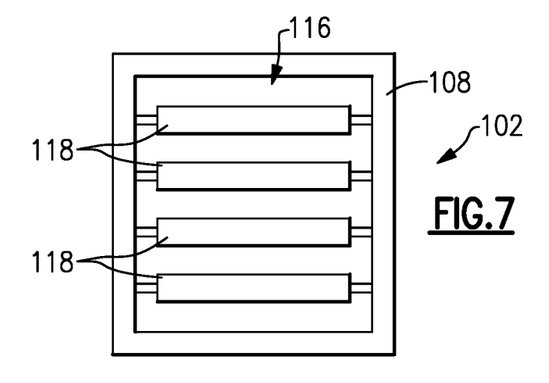
FIG. 7 is a schematic view of another example of a throttle member as used in the heat exchanger system shown in FIG. 2.
Figure 8:
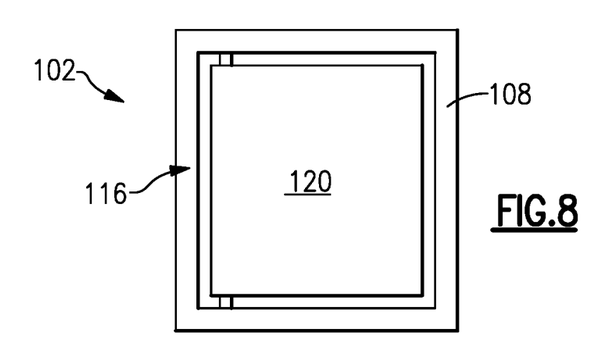
FIG. 8 is a schematic view of another example of a throttle member as used in the heat exchanger system shown in FIG. 2.

In one example, the moveable member 116 comprises one or more pivoting vanes or louvers 118 that are mounted within the frame 108. The louvers 118 can comprise vertical louvers as shown in FIGS. 4B, 6A and 6B, or can comprise horizontal louvers as shown in FIG. 7. In another example, the moveable member 116 can comprise one or more sliding or pivoting doors 120 as shown in FIG. 8. The louvers 118 and door 120 are moved between the open and closed positions to control the amount of air flow through the pre-cooler 96.

Flow exits the outlet duct 114 in the outlet section 74 of the system. The outlet duct 114 is mounted directly to a downstream end of the frame 108 and defines an outlet opening 124 that directs air flow back into the main fan flow path. In the example shown, the outlet opening 124 has a cross-sectional area that is less than the cross-sectional area defined by the frame 108 of the throttle member.

An actuator 130 is configured to control movement of the louvers 118 (or doors 120) between the fully open and fully closed positions. The actuator 130 is controlled via an electronic controller 132 to move the louvers (or doors 120) to a desired position based on predetermined operational requirements. The actuator 130 is located remotely from the heat exchanger system, e.g. remotely from the pre-cooler 96, to avoid overheating. The actuator 130 drives a rod or linkage mechanism 134 which is coupled to the louvers 118 (or doors 120). In one example, the actuator 130 is used to control the angle of the louvers 118 relative to the flow path to vector the flow to be more in line with the bypass flow as the air exits the outlet opening 124.

FIG. 5 shows an example of the heat exchange system positioned within the gas turbine engine architecture. An outer nacelle 140 surrounds the fan 42 that rotates about the engine axis. The outer nacelle 140 has an upstream nacelle end 142 and a downstream nacelle end 144. A core nacelle 146 is positioned radially inward of the outer nacelle 140 and surrounds the core engine 62. The bypass flow path B is defined between the outer nacelle 140 and the core nacelle 146. An upper bifurcation structure 150 is configured extend between the outer nacelle 140 and the core nacelle 146.

The heat exchange system 60 is at least partially incorporated into the upper bifurcation structure 150. The diffusing section 68, pre-cooler 96, and throttle member 102 are positioned radially between the pylon structure 64 and the core engine 62. A downstream end of the outer nacelle 140 at the fan nozzle is indicated at line 152. The use of the polygonal shaped throttle member 102 that matches the shape of the pre-cooler 96 provides for a much more compact and shorter length heat exchange system 60. In the example shown, the pre-cooler 96 and throttle member 102 do not extend downstream of this line 152.

Figure 9:
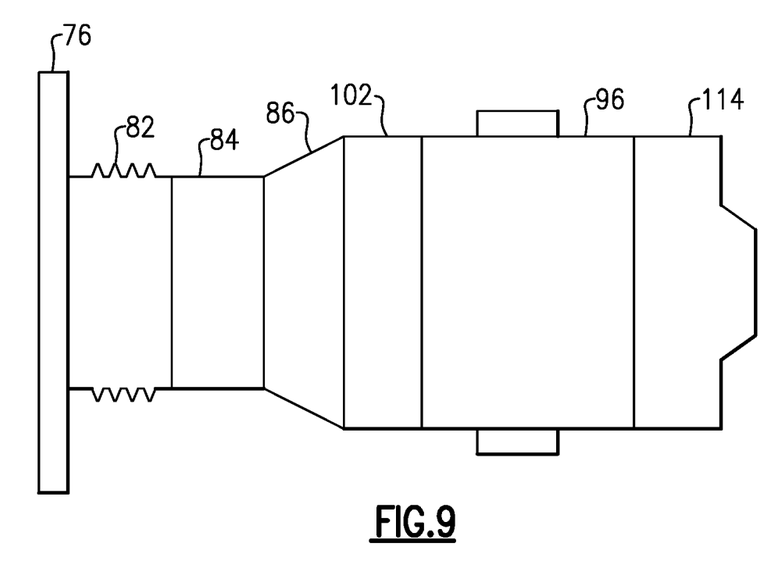
FIG. 9 is a schematic view of another example of a heat exchanger system incorporating the subject invention.

In the example shown in FIGS. 2-5, the throttle member 102 is positioned directly downstream of the pre-cooler 96. However, the throttle member 102 could also be positioned directly upstream of the pre-cooler 96 as shown in FIG. 9. The downstream location is preferred because it provides the highest pressure and most uniform flow. The upstream location provides a less desirable pressure differential.

Further, while a pre-cooler 96 is shown as the heat exchange structure, it should be understood that the throttle member can be used with other heat exchange structures that use air as a cooling medium. In the example shown, the pre-cooler 96 is packaged in the upper bifurcation 150, and can be either on the engine side or aircraft side of a pylon floor 156 (FIG. 3). The system uses bypass air as a cooling source and a leading area of the upper bifurcation 150 helps to direct air into the system for maximum inlet pressure when running and provides for minimum drag when not running.

Using the polygonal shaped throttle member 102 eliminates the need for the traditionally used butterfly valve, which required a round cross-sectional mounting structure. The pre-cooler 96 has a large square or rectangular frontal area to provide the desired cooling characteristics and the associated ducts are designed to optimize and diffuse the air entering the pre-cooler 96 from the inlet. In prior configurations, the duct configuration was significantly longer and more complex due to the transitions that were required between round to square or rectangular cross-sections.

Further, when using the traditional butterfly valve upstream of the heat exchange structure, the valve could leak when in the closed position, which could cause the air to be driven down more on one side, and result in asymmetrical flow through the heat exchange structure. The butterfly valve could also cause distortion in the flow path when in the open position. The subject invention avoids these potential problems by placing the polygonal throttle member 102 downstream of the heat exchange structure. This reduces inlet pressure loss and provides a more uniform inlet flow to reduce thermal gradients and improve the heat exchanger performance Additionally, the use of the louvers allows direct control of the flow to improve performance and/or control noise.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
   An upper bifurcation structure configured to extend between an outer nacelle and a core nacelle of a gas turbine engine; and
   a heat exchange system at least partially incorporated into the upper bifurcation structure, the heat exchange system including:
      a diffusing duct,
      a heat exchange structure having an upstream end and a downstream end,
      a throttle member to control an air flow through the heat exchange structure, wherein the throttle member: (a) has a non-circular cross section; and (b) is mounted directly to the downstream end of the heat exchange structure or is mounted directly between the upstream end of the heat exchange structure and the diffusing duct, and
      an outlet duct having an upstream end and a downstream end defining an outlet opening that directs the air flow exiting the downstream end of the heat exchange structure back into an engine bypass flow path, and wherein the throttle member is positioned upstream of the upstream end of the outlet duct.

2. The gas turbine engine component according to claim 1 wherein the throttle member includes a frame defining a non-circular cross-sectional flow area and a moveable member mounted for movement relative to the frame, wherein the moveable member is moveable between a fully open position where a minimum amount of the non-circular cross-sectional flow area is blocked and a fully closed position where a maximum amount of the non-circular cross-sectional flow area is blocked.

3. The gas turbine engine component according to claim 2 wherein the non-circular cross-sectional flow area comprises a polygonal cross-sectional flow area.

4. The gas turbine engine component according to claim 2 wherein the moveable member comprises a plurality of horizontal or vertical louvers.

5. The gas turbine engine component according to claim 2 wherein the moveable member comprises a pivoting or sliding vane or door.

6. The gas turbine engine component according to claim 1 wherein the throttle member includes a frame having a first end that is mounted directly to the downstream end of the heat exchange structure and a second end that is mounted directly to the upstream end of the outlet duct.

7. The gas turbine engine component according to claim 1 wherein the throttle member includes a frame having a first end that is mounted directly to an outlet end of the diffusing duct and a second end that is mounted directly to the upstream end of the heat exchange structure.

8. The gas turbine engine component according to claim 1 wherein the diffusing duct includes a duct portion that increases in cross-sectional flow area from an upstream duct end to a downstream duct end.

9. The gas turbine engine component according to claim 8 wherein the diffusing duct comprises a first stage and a second stage downstream of the first stage, and wherein the first stage comprises an axial duct portion of generally constant cross-sectional flow area, and wherein the second stage comprises the duct portion that extends from the upstream duct end to the downstream duct end.

10. The gas turbine engine component according to claim 1 including an actuator configured to control the throttle member, and wherein the actuator is located remotely from the heat exchange structure.

11. The gas turbine engine component according to claim 1 including the outer nacelle surrounding a fan that rotates about an engine axis, the outer nacelle having an upstream nacelle end and a downstream nacelle end, and wherein the heat exchange structure comprises a heat exchanger or a precooler, and wherein the throttle member and the heat exchanger or precooler do not extend downstream of the downstream nacelle end.

12. The gas turbine engine component according to claim 1 wherein the heat exchange structure comprises a heat exchanger or a precooler, and wherein the outer nacelle surrounds a fan that rotates about an engine axis, and wherein the core nacelle is positioned radially inward of the outer nacelle and surrounds a core engine that includes at least one spool that rotates about the engine axis and interconnects the fan with a compressor section and a turbine section, and wherein the bypass flow path is defined between the outer nacelle and the core nacelle, and wherein the heat exchanger or a precooler uses a bypass flow for cooling purposes.

13. A gas turbine engine component comprising:
an upper bifurcation structure configured to extend between an outer nacelle and a core nacelle of a gas turbine engine; and
a heat exchange system at least partially incorporated into the upper bifurcation structure, the heat exchange system including:
a diffusing duct,
a heat exchange structure having an upstream end and a downstream end,
an outlet duct having an upstream end and a downstream end defining an outlet opening that directs a flow exiting the downstream end of the heat exchange structure back into an engine bypass flow path,
a throttle member including a frame having a first end mounted directly to the downstream end of the heat exchange structure and a second end mounted directly to the upstream end of the outlet duct, the frame defining a non-circular cross-sectional flow area, and wherein the throttle member includes a moveable member mounted for movement relative to the frame upstream of the second end of the frame, wherein the moveable member is moveable between a fully open position where a minimum amount of the non-circular cross-sectional flow area is blocked and a fully closed position where a maximum amount of the non-circular cross-sectional flow area is blocked, and
an actuator configured to control movement of the moveable member between the fully open and fully closed positions.

14. The gas turbine engine component according to claim 13 wherein the non-circular cross-sectional flow area comprises a rectangular or square cross-sectional flow area.

15. The gas turbine engine component according to claim 13 wherein the moveable member comprises a plurality of pivoting louvers that are coupled to the actuator.

16. The gas turbine engine component according to claim 15 wherein the actuator controls a pivot angle of the plurality of pivoting louvers such that the plurality of pivoting louvers vector flow exiting the outlet opening to be aligned with bypass flow during predetermined operating conditions.

17. The gas turbine engine component according to claim 13 wherein the diffusing duct comprises a first diffusing stage providing an axial duct portion of a generally constant first cross-sectional flow area and a second diffusing stage downstream of the first diffusing stage, and wherein the second diffusing stage comprises an increasing duct portion having an upstream duct end having the first cross-sectional flow area and a downstream duct end having a second cross-sectional flow area that is greater than the first cross-sectional flow area.

18. The gas turbine engine component according to claim 13 including a flexible bellows mounted to an upstream duct end of the diffusing duct.

19. The gas turbine engine component according to claim 13 including the outer nacelle surrounding a fan that rotates about an engine axis, the outer nacelle having an upstream nacelle end and a downstream nacelle end, and wherein the heat exchange structure comprises a heat exchanger or a precooler, and wherein the throttle member and the heat exchanger or precooler do not extend downstream of the downstream nacelle end.

20. The gas turbine engine component according to claim 13 wherein the frame has a polygonal shape that matches a shape of the heat exchange structure, and wherein the non-circular cross-sectional flow area of the frame is constant from an upstream end of the frame to a downstream end of the frame.

21. The gas turbine engine component according to claim 13 wherein the heat exchange structure comprises a heat exchanger or a precooler, and wherein the outer nacelle surrounds a fan that rotates about an engine axis, and wherein the core nacelle is positioned radially inward of the outer nacelle and surrounds a core engine that includes at least one spool that rotates about the engine axis and interconnects the fan with a compressor section and a turbine section, and wherein the bypass flow path is defined between the outer nacelle and the core nacelle, and wherein the heat exchanger or a precooler uses a bypass flow for cooling purposes.

22. A gas turbine engine comprising:
an outer nacelle surrounding a fan that rotates about an engine axis, the outer nacelle having an upstream nacelle end and a downstream nacelle end;
a core nacelle positioned radially inward of the outer nacelle and surrounding a core engine that includes at least one spool that rotates about the engine axis and interconnects the fan with a compressor section and a turbine section, and wherein a bypass flow path is defined between the outer nacelle and the core nacelle;
an upper bifurcation structure configured to extend between the outer nacelle and the core nacelle; and
a heat exchanger at least partially incorporated into the upper bifurcation structure, wherein the heat exchanger comprises:
a pre-cooler having an upstream end and a downstream end,
a diffusing duct associated with the upstream end,
an outlet duct having an upstream end and a downstream end defining an outlet opening that directs flow exiting the downstream end of the heat exchanger back into an engine bypass flow path, and
a throttle member mounted directly to the downstream end of the pre-cooler or mounted directly between the upstream end of the pre-cooler and the diffusing duct, and wherein the throttle member comprises a frame defining a non-circular cross-sectional flow area and a moveable member mounted for movement relative to the frame to throttle flow, and wherein the throttle member is positioned upstream of the upstream end of the outlet duct.

23. The gas turbine engine according to claim 22 wherein the frame has a first end that is mounted directly to the downstream end of the pre-cooler and a second end that is mounted directly to the upstream end of the outlet duct, and wherein the moveable member comprises a plurality of pivoting vanes or louvers that are moveable upstream of the second end of the frame between a fully open position where a minimum amount of the non-circular cross-sectional flow area is blocked and a fully closed position where a maximum amount of the non-circular cross-sectional flow area is blocked.

24. The gas turbine engine according to claim 22 including an actuator coupled to the moveable member to control movement of the moveable member between open and closed positions, and wherein the actuator is located remotely from the heat exchanger.

25. The gas turbine engine according to claim 22 wherein the throttle frame has a first end that is mounted directly to an outlet end of the diffusing duct and a second end that is mounted directly to the upstream end of the heat exchanger.

26. The gas turbine engine according to claim 22, wherein the pre-cooler and the throttle member do not extend downstream of the downstream nacelle end.

27. The gas turbine engine according to claim 22, wherein the frame has a polygonal shape that matches a shape of the pre-cooler, and wherein the non-circular cross-sectional flow area of the frame is constant from an upstream end of the frame to a downstream end of the frame.

* * * * *